Patented Oct. 17, 1939

2,176,495

UNITED STATES PATENT OFFICE 2,176,495

METHOD OF PRODUCING CADMIUM SELENIDE

Neil E. Gordon, Fayette, Mo., and Edgar C. Pitzer, Baltimore, Md., assignors to The Chemical Foundation, Incorporated, a corporation of Delaware No Drawing. Application May 20, 1937, Serial No. 143,728

4 Claims. (Cl. 23—50)

This invention relates to an improved method of producing metal selenides, more particularly to a novel process of producing cadmium selenide of high purity.

It is known that cadmium selenide presents marked utility in the arts, particularly as a pigment in the paint and ceramic industries. When properly associated with suitable substrates, a wide gradation of color values is obtainable. Such pigments are especially desired because of their permanence and high heat resistance.

If cadmium selenide could be produced in substantially pure form and at a relatively low price, its use in the arts could be greatly expanded, becoming available, for example, as an intermediate in the production of organic chemicals; as a source of sodium selenide, hydrogen selenide, and the like.

Since the pigment industry presents the classical use of cadmium selenide, the present invention can best be illustrated and evaluated by a direct comparison with the present method of production now utilized in this field. It will be appreciated, however, that the novel process of production of cadmium selenide comprehended herein inherently establishes a wider potential use of the product than obtained heretofore. The process insures the production of a product of high purity from relatively cheap and readily available sources of selenium.

Selenium largely occurs in nature associated with pyrites and copper ores. A major source is the flue dust obtained in the burning of pyrites in the manufacture of sulphuric acid, being recovered as a sublimed selenium dioxide. A second important source is the anode mud recovered from the electrolytic cells in the electrolytic refining of copper.

In the present state of the pigment art cadmium selenide is usually produced as a co-precipitate with metal sulphates, such as barium sulphate, by mixing solutions of barium sulphoselenide and cadmium sulphate. This type of procedure involves many practical difficulties. In the first place, pure cadmium selenide obviously cannot be made according to this reaction. Again, there are certain undesired side reactions which obtain and which materially increase the difficulty of operation and reduce the yield. Thus, in this apparently simple reaction, there occurs a not inconsiderable hydrolysis of barium sulphide and an evolution of hydrogen sulphide, a substantial oxidation of barium sulphide to the sulphate, oxidation of the polyselenide, separation of the red selenium, and, finally, volatilization of the selenium during the ignition of the precipitate.

For utilization in the ceramic field it has been proposed to produce cadmium selenide by a number of different methods.

The first such method is the direct combination of the two elements, i. e. cadmium metal and the selenium metalloid. This method is inefficient because of serious volatilization losses.

A second possible method involves the reduction of cadmium selenite with carbon. This method is uneconomical because it requires preliminary production of the selenite.

Yet another possible method is by reacting cadmium sulphate with hydrogen selenide to produce, by double decomposition, cadmium selenide and sulphuric acid. This method, similarly, is objectionable because of the instability of the hydrogen selenide and particularly because of its toxic character.

A further suggested method of producing the cadmium selenide involves the reaction of cadmium sulphate with sodium selenide. This type of procedure presents serious objections, particularly in that the sodium selenide is very unstable. Furthermore, the production of the sodium selenide itself is considerably involved. This reaction would appear to be a simple one, proceeding according to the following equation:

$$CdSO_4 + Na_2Se \rightarrow CdSe + Na_2SO_4$$

However, the starting material, sodium selenide, is very unstable and is difficult to prepare. This compound decomposes in the presence of water into toxic hydrogen selenide and caustic according to the following equation:

$$Na_2Se + H_2O \rightarrow 2NaOH + H_2Se$$

In the presence of oxygen a similar reaction ensues with the production of elemental selenium, according to the following equation:

$$Na_2Se + O + H_2O \rightarrow 2NaOH + Se$$

The production of sodium selenide from selenium is in itself a protracted and difficult operation and proceeds substantially according to the following reactions. As the direct union of the elements takes place with explosive violence, the selenium is first oxidized to selenium dioxide according to the following equation:

$$Se + O_2 \rightarrow SeO_2$$

The dioxide is hydrated to form selenious acid, according to the following equation:

$$SeO_2 + H_2O \rightarrow H_2SeO_3$$

The acid is then reacted with sodium hydroxide to produce sodium selenite, according to the following equation:

$$H_2SeO_3 + 2NaOH \rightarrow 2H_2O + Na_2SeO_3$$

Finally the selenite must then be reduced to the selenide, as for example according to the following equation:

$$Na_2SeO_3 + 3C \rightarrow Na_2Se + 3CO$$

In each of these reactions marked difficulties or drawbacks obtain. For example, in what would appear to be the simple oxidation of selenium to the dioxide, when air is used as the oxidizing agent, a considerable amount of selenium monoxide is formed and is difficult to recover. If other oxidizing agents, such as nitric acid, are used, the resulting solution of selenious acid in the nitric acid must be evaporated to dryness and carefully calcined. Again, in the production of the sodium selenite, expensive evaporation is necessary, since this compound is very soluble. The reduction of the selenite to the selenide with carbon necessarily involves expensive furnace equipment.

Finally, due to the hydrolysis of the sodium selenide to selenium and/or hydrogen selenide, a considerable quantity of the selenium is abstracted from the reaction and is therefore unavailable, and furthermore, because of the formation of the toxic hydrogen selenide, special ventilation precautions must be taken.

As compared to such prior methods, involving the ultimate utilization of the sodium selenide, the direct production of substantially pure cadmium selenide offers marked advantages. This compound is relatively stable and does not hydrolyze in air or water to the marked degree that characterizes sodium selenide. Furthermore, utilizing the relatively pure cadmium selenide, pure hydrogen selenide is readily obtainable with minimal equipment; and, as will be appreciated, the exhaust liquor can be returned to the selenidization cycle without loss of the expensive selenious or cadmium material.

It has been found, as a result of considerable experimentation, that substantially pure cadmium selenide may be obtained by a simple type of reaction utilizing inexpensive starting materials, when certain precautions are observed. It has been found that when a marked paucity of a cadmium salt, such as cadmium sulphate, is reacted with a solution of an alkali metal seleno-sulphate and the temperature and photochemical conditions are carefully controlled, substantially pure cadmium selenide may be produced.

Therefore, a major object of the present invention is to devise a simple and effective method of producing substantially pure cadmium selenide.

Yet another object of the invention is to provide a process for producing cadmium selenide in substantially any desired state of purity.

A further object is to provide a new and improved cadmium selenide-containing pigment.

A still further object is to produce substantially pure cadmium selenide from inexpensive and relatively impure starting materials.

With these and other equally important objects in view, the invention comprehends the concept of reacting a cheap and readily available cadmium containing salt, such as cadmium sulphate, with an alkali metal seleno-sulphate under especially correlated conditions of temperature, photochemical environment, and quantities of the reactants, to produce cadmium selenide in a state of substantial purity. This method, as will be appreciated, is in sharp contradistinction to the usual prior art methods in which the production of the relatively pure cadmium selenide is substantially impossible.

The present invention is based essentially on the discovery that when a cadmium salt, such as cadmium sulphate, is reacted with an excess of a metal seleno-sulphate, such as sodium seleno-sulphate, substantially pure cadmium selenide may be produced.

Theoretically considered, it might appear that in order to produce the cadmium selenide, utilizing such a reaction, substantially stoichiometrical amounts of the reactants ought to be employed. As a matter of fact, such a procedure has been suggested (Rathke, Prakt. Chem., 95, 1, 1865). According to this investigator, cadmium selenide may be prepared by reacting cadmium sulphate with potassium seleno-sulphate to produce the cadmium seleno-sulphate and hydrolyzing the product with dilute acid to produce the cadmium selenide according to the following equations:

$$CdSO_4 + K_2SSeO_3 \rightarrow CdSSeO_3 + K_2SO_4$$

$$CdSSeO_3 + H_2O \rightarrow CdSe + H_2SO_4$$

With this type of reaction, using stoichiometrical amounts of the reactants, the selenium content of the initial precipitate is very low. Such precipitate appears to be a mixture of cadmium selenide, cadmium seleno-sulphate, and cadmium sulphite. If such precipitate is boiled with dilute acid, as recommended by Rathke, it is clear that substantially pure cadmium selenide cannot be obtained because of contamination with free selenium:

$$SSeO_3^{--} + 2H^+ \rightarrow H_2O + SO_2 + Se$$

Such a proposed method therefore is not operative to produce cadmium selenide in a high state of purity.

On the other hand, if the reaction is effected utilizing a marked excess of sodium seleno-sulphate and under carefully controlled temperatures, cadmium selenide of a high state of purity is obtainable.

To more particularly illustrate the invention the following example is given as indicative of the type of procedure according to the invention.

To 200 cc. of $Na_2SSeO_3$ (solution containing 0.015 g. of Se per cc.) there was added 40 cc. of $CdSO_4$ (solution containing 0.0249 g. of Cd per cc.). The solution, when mixed at room temperature, remained clear; when heated to boiling, a dark red precipitate formed. Upon continuing the boiling for approximately an hour, the color of the initial red precipitate turned gradually to a brown. The precipitate was separated by filtration and was dried at 100° C. The product, upon analysis, showed the following:

|   | Per cent |
|---|---|
| Cd | 58.87 |
| Se | 41.25 |

It is to be noted that this compares very closely to theoretical CdSe, the analysis of which is:

$$Cd = 58.7$$
$$Se = 41.3$$

This experiment clearly indicates that when a marked excess of the sodium seleno-sulphate is employed, substantially pure cadmium selenide may be prepared.

It was also found that successive precipitates of the cadmium selenide may be produced by re-employing the filtrate, containing the excess sodium seleno-sulphate.

It was found with further experimentation that substantially pure cadmium selenide may be produced by utilizing the particular reactants mentioned and insuring an excess of the sodium salt. For practical purposes this amount can be determined by adding cadmium sulphate up to a concentration which is just insufficient to produce permanent turbidity. Utilizing such amounts and then boiling the solution insures the production of the cadmium selenide of from 95 to 100% purity.

In addition to the critical effect of the quantity of reactants, other factors are of salient importance in the reaction. It has been found, for example, that the temperature of precipitation plays a very important role. Thus when cold solutions of the cadmium sulphate and the sodium seleno-sulphate are mixed, a yellow precipitate is formed. When this precipitate is dried it turns to a light red color. This product, upon analysis, was found to contain 26.8% of selenium. Since the pure cadmium seleno-sulphate contains 28.2% of selenium, the analysis of the above product indicates that a small amount of cadmium sulphite tends to precipitate from cold solutions. When a sample is prepared by mixing the two solutions at 60° C., the initial precipitate is of a dark red color and contains substantially 34.4% of selenium. When the precipitation is effected from hot solutions after an appreciable boiling period, precipitates containing approximately 39.3% of selenium are obtained. These precipitates are of a brownish-black color. It is thus to be observed that for the production of the substantially pure cadmium selenide, the temperature conditions of the reaction must be carefully controlled.

It was further found that the photochemical environment of the reaction is of considerable importance. It has been found that if the indicated solutions are mixed in the stoichiometric ratios and the solution is kept in the dark, the initial precipitate is a canary yellow and this color is retained for several hours. The color, however, in course of time tends to change; for example, such precipitate, when allowed to stand in the dark for a period of a week, is changed to a bright red.

Again, if a solution is made up of stoichiometrical amounts of the reactants and is agitated in diffused daylight, the red color is acquired in approximately an hour. Again, if the reaction is carried out in direct sunlight, the transformation is very rapid, the walls of the vessel becoming coated very quickly with a film of brownish-black precipitate. This film of dark precipitate acts as a filter and tends to protect the main body of the solution from the effect of the light.

As a result of considerable experimentation it has been found that this photochemical effect is due to light that lies within the visible range, for carrying out the reaction under the action of ultraviolet and infrared radiation prevents the change in color noted above.

It is thus to be observed that within the scope of the present invention there are two different methods by which substantially pure cadmium selenide may be produced. In the first method, the formation of the cadmium selenide is insured by establishing a definite paucity of the cadmium sulphate and effecting the hydrolysis of the initial precipitate at carefully controlled elevated temperatures. In the second method, a high yield of the cadmium selenide may be assured by adopting the obvious expedient of utilizing substantially equivalent amounts of the reactants but invoking the unobvious and unexpectable photochemical action of electromagnetic energy, the wave length of which lies substantially within the visible range.

For practical and commercial purposes the first method is, obviously, preferred. Such a method is manifestly less expensive and far more amenable to typical commercial production methods. It is to be understood that the preferred method may be effectuated when utilizing relatively cheap starting materials. Thus the described reaction may be run by utilizing sodium seleno-sulphate in the presence of excess sodium sulphite in lieu of an excess of the sodium seleno-sulphate itself.

Similarly, the substantially pure calcium selenide may be produced according to the present method by employing cheap and readily available starting materials. For example, as intimated hereinbefore, in the treatment of seleniferous pyrites, a crystalline needle-like sublimate of selenium dioxide (whiskers) is produced. This compound is very soluble in water and if a large excess of sodium carbonate and sulfurdioxide is added the reagent sodium seleno-sulphate may be obtained directly and without involving the additional expense of the intermediate recovery of free selenium. Such a direct production of the desired seleno-sulphate salt is indicated by the following equation:

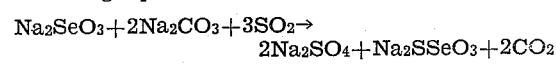

$$Na_2SeO_3 + 2Na_2CO_3 + 3SO_2 \rightarrow 2Na_2SO_4 + Na_2SSeO_3 + 2CO_2$$

It will be understood that in actual practice a marked excess of sodium sulphite is desirable in order to favorably displace the equilibrium in favor of the formation of the seleno-sulphate, as indicated by the following equation:

$$Na_2SO_3 + Se \rightarrow Na_2SSeO_3$$

It will also be appreciated that the sodium sulphite utilized for the process may be readily obtained, and, as a matter of fact, cheap sources of this compound may be utilized. It has been found that the chloride ion does not inhibit or interfere with the reaction and hence the sodium sulphite employed could be prepared from the unpurified electrolytic caustic soda.

Similarly the copper anode slimes may, so to speak, be utilized as starting material for the present method. As mentioned hereinbefore, much of the selenium of commerce is obtained from this source, that is to say, from the strongly alkaline liquors resulting from the treatment of these slimes. Sodium selenite and sodium selenate are present in such alkaline solution. When operating under the present process a cheap starting material may be prepared by passing sulfur dioxide into such alkaline solutions to produce the sodium seleno-sulphate. Here again the expensive step of preliminary preparation of the free selenium is obviated.

Again, other methods of preparing the seleno-sulphate may be availed of. For example, a seleno-sulphate salt may be produced by passing sulfur dioxide into a suspension of selenium in aqua ammonia to produce the ammonium seleno-sulphate according to the following reaction:

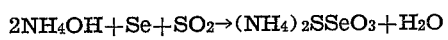

$$2NH_4OH + Se + SO_2 \rightarrow (NH_4)_2SSeO_3 + H_2O$$

As will be understood, the completion of the reaction is indicated by the appearance of the free selenium. This may be redissolved by the addition of excess ammonium hydroxide.

It will be understood that the method of producing substantially pure cadmium selenide, as described hereinbefore, presents a wide permissive latitude, and wide gradations in color shades, for the production of pigments. When utilizing substantially pure cadmium selenide with suitable substrates, such for example as cadmium sulphide, barium sulphate and the like, not only may a wide gradation of colorimetric values be obtained, but such values may be accurately controlled. In other words, by utilizing a pure cadmium selenide rather than, as in the past, an impure mixture of cadmium selenide, cadmium sulphide, etc., the ultimate color values may be, in a sense, quantitatively established. It will be understood, of course, that when the cadmium selenide is to be utilized as a pigment it may be employed with the usual co-precipitants and subjected to the heat treatment usual in the arts.

As noted hereinbefore, a major advantage of the present invention resides in the possibility of utilizing the pure cadmium selenide as a starting material in organic reactions or syntheses, such for example as in the preparation of selenomercaptans, to be employed as addition agents for gasoline and the like. The invention is, however, of salient importance in the pigment and ceramic industry, since it establishes, in effect, a stoichiometric basis for compounding selenium-containing pigments in chromatic gradation.

While preferred modifications of the invention have been described, it is to be understood that these are given didactically to illustrate the fundamental principles involved. The invention is not to be considered limited to the precise methods described, except as such limitations are clearly imposed by the appended claims.

We claim:

1. A method of producing cadmium selenide which comprises reacting cadmium sulphate in aqueous solution with a definitely established substantial excess of an alkali seleno-sulphate, and hydrolizing the intermediate product in said solution, at a temperature of between substantially 60° C. and 100° C.

2. A method of producing substantially pure cadimium selenide which comprises reacting cadmium sulphate in aqueous solution with a substantial excess of sodium seleno-sulphate and hydrolyzing the formed cadmium seleno-sulphate at a temperature of between substantially 60° C. and 100° C. in the presence of the sodium selenosulphate.

3. A method of producing substantially pure cadmium selenide which comprises reacting cadmium sulphate in aqueous medium with a substantial excess of alkali seleno-sulphate, hydrolyzing the formed cadmium seleno-sulphate to cadmium selenide in the presence of said selenosulphate, at a temperature of between 60° C. and 100° C., filtering the precipitate and re-employing the filtrate with additional amounts of cadmium sulphate to produce an additional quantity of the cadmium selenide.

4. A method of producing cadmium selenide which comprises reacting cadmium sulphate with a definitely established substantial excess of ammonium seleno-sulphate and hydrolyzing the resulting product in the presence of the excess seleno-sulphate in aqueous solution at temperatures of the order of 100° C. for a period of time sufficiently prolonged to produce a precipitate of cadmium selenide.

NEIL E. GORDON.
EDGAR C. PITZER.